United States Patent
Yuasa (10) Patent No.: US 6,906,851 B2
(45) Date of Patent: Jun. 14, 2005

(54) ELECTROPHORETIC DISPLAY DEVICE AND METHOD OF PRODUCING THE SAME

(75) Inventor: Satoshi Yuasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/448,189

(22) Filed: May 30, 2003

(65) Prior Publication Data

US 2003/0222842 A1 Dec. 4, 2003

(30) Foreign Application Priority Data

May 31, 2002 (JP) ........................................ 2002-158403

(51) Int. Cl.⁷ .......................... G02B 26/00; G09G 3/34; G03G 17/04; G01R 1/12
(52) U.S. Cl. ...................... 359/296; 345/107; 204/600; 430/32
(58) Field of Search .......................... 359/296; 345/105, 345/107; 430/32, 34, 35; 204/450, 471, 600, 605, 606; 264/4.1, 4.3; 427/213.3, 213.31

(56) References Cited

U.S. PATENT DOCUMENTS

| | | | |
|---|---|---|---|
| 4,779,962 A | 10/1988 | Nishimura et al. | 359/245 |
| 5,007,714 A | 4/1991 | Nishimura et al. | 359/241 |
| 6,400,430 B2 * | 6/2002 | Nakao et al. | 349/89 |
| 6,822,783 B2 * | 11/2004 | Matsuda et al. | 359/296 |
| 2003/0013238 A1 * | 1/2003 | Ogawa | 438/151 |

FOREIGN PATENT DOCUMENTS

| | | |
|---|---|---|
| JP | 2551783 | 8/1996 |
| JP | 2000-35598 | 2/2000 |
| JP | 2000-235771 | 8/2000 |

* cited by examiner

*Primary Examiner*—Loha Ben
*Assistant Examiner*—William Choi
(74) *Attorney, Agent, or Firm*—Fitzpatrick, Cella, Harper & Scinto

(57) ABSTRACT

An electrophoretic display device executes a display on the basis of dispersing charged particles in a liquid and moving the charged particles under application of an electric field. The device includes a first substrate having an electrode, a film mounted on the first substrate and forming a closed portion with a surface of the first substrate, and a liquid positioned in the closed portion, with charged particles being dispersed in the liquid.

28 Claims, 6 Drawing Sheets

ELECTROPHORETIC DISPLAY DEVICE AND METHOD OF PRODUCING THE SAME

BACKGROUND OF THE INVENTION

1. Field of the Invention

The present invention relates to an electrophoretic display device for executing a display utilizing electrophoresis of charged particles, and a method of producing an electrophoretic display device.

2. Related Background Art

There is already known an electrophoretic display device for executing a display utilizing an electrophoretic phenomenon of charged particles. In such device, an insulating liquid and charged particles are positioned between a pair of substrates of which at least either is transparent, and an electric field is applied therebetween by electrodes provided on either or both of the substrates to change a distribution of the charged particles, thereby performing a display. Such electrophoretic display device has the following advantages:

(a) the device has no dependence on polarizing characteristics or on a viewing angle, in contrast to the liquid crystal display;

(b) the device provides a bright display with a high utilization rate of light because of no use of polarizing plates;

(c) the device provides a non-light-emitting type passive display which is less tiring to the eyes in case of a prolonged observation, in contrast to light-emitting displays such as CRT, LED or EL; and (d) the device is capable of rewriting a display with a low electric power consumption and it has a memory property, so that the electric power consumption is very little except for at the time of the rewriting display.

In such electrophoretic display device, it is necessary to prevent leakage of the insulating liquid.

Also in case of providing spacers for forming a uniform gap between the substrates or forming partition members for inhibiting a movement of the charged particles from a pixel to another pixel in order to prevent a display unevenness, an optical aperture rate is lowered to deteriorate the contrast or brightness of the display. Also unless a stable contact is secured between the substrate and the partition member, there cannot be avoided an unevenness in the thickness of the insulating liquid and an unevenness in time of a concentration of the charged particles.

Therefore, Japanese Patent No. 2551783 discloses a configuration of enclosing the insulating liquid and the charged particles in microcapsules and supporting such microcapsules between a pair of substrates (hereinafter called "Conventional Example 1").

Also Japanese Patent Application Laid-Open No. 2000-35598 proposes, for positioning such microcapsules in desired positions, a method of supplying microcapsules one by one onto a surface of the substrate from a nozzle, utilizing an ink jet technology (hereinafter called "Conventional Example 2").

Also Japanese Patent Application Laid-Open No. 2001-235771 proposes a method of discharging an insulating liquid by an ink jet method into a region surrounded by partition members on a surface of the substrate, and then bonding an opposed substrate to them (hereinafter called "Conventional Example 3"). Such method allows to separately supply the insulating liquids of different kinds to predetermined positions thereby enabling to produce a multi-color display device.

Such conventional examples have an advantage capable of preventing leakage of the insulating liquid, but are associated with a problem of an exact placing of a microcapsule in a position corresponding to a display electrode.

Also it is extremely difficult technically to securely supply the microcapsules one by one by the ink jet technology. Also in a large-sized high definition display panel, it becomes necessary to place an enormous number of microcapsules in predetermined positions, and the preparation of a display panel requires a long time by the method of supplying the microcapsules one by one from the nozzle.

Also the conventional examples have been associated with a problem of an inclusion or a bubble or a migration of the charged particles to another pixel, at the adhesion of the opposed substrate.

SUMMARY OF THE INVENTION

The present invention provides an electrophoretic display device capable of preventing leakage of a liquid, and a method of producing the same.

The present invention, which has been made in consideration of the foregoing situation, provides an electrophoretic display device for executing a display on the basis of dispersing charged particles in a liquid and moving the charged particles under application of an electric field, the device comprising:

a first substrate having an electrode;

a film mounted on the first substrate and forming a closed portion with a surface of the first substrate; and a liquid positioned in the closed portion, charged particles being dispersed in the liquid.

The present invention also provides a method of producing an electrophoretic display device for executing a display on the basis of dispersing charged particles in a liquid and moving the charged particles under the application of an electric field, the method comprising:

a step of forming, on a surface of a substrate, a region of a high affinity to the liquid and a region of a low affinity;

a step of forming a droplet of the liquid, in which the charged particles are dispersed, in the region of the high affinity; and a step of forming a film on a surface of the liquid droplet not in contact with the substrate.

DETAILED DESCRIPTION OF THE PREFERRED EMBODIMENTS

In the following, embodiments of the present invention will be described with reference to FIGS. 1 through 6B.

(1) At First there will be Given an Explanation on the Entire Configuration of an Electrophoretic Display Device of the Present Invention.

Figure 1:
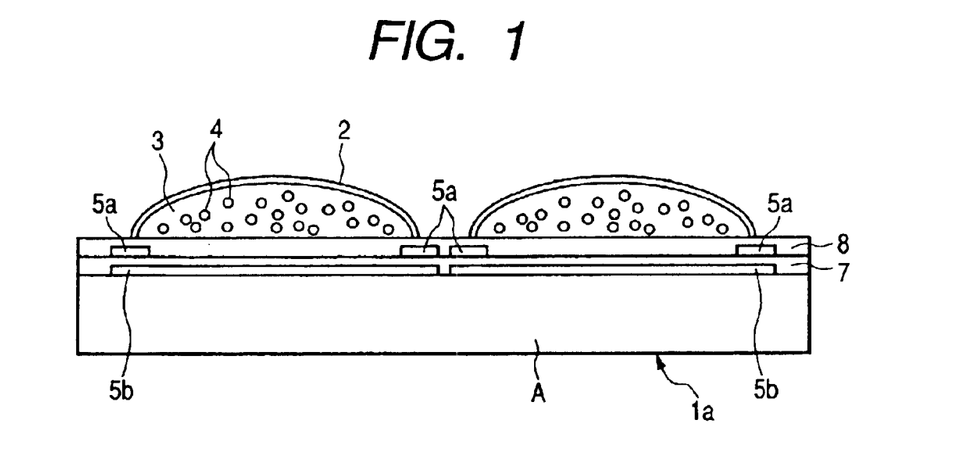
FIG. 1 is a cross-sectional view showing a configuration of an electrophoretic display device of the present invention.

The electrophoretic display device of the present invention includes, as shown in FIG. 1, a first substrate 1a, a film 2 mounted along the first substrate 1a for forming a closed portion with a first substrate 1a, a liquid 3 and a plurality of charged particles 4 positioned in the closed portion, and a pair of electrodes 5a and 5b positioned in a vicinity of the closed portion, wherein the charged particles 4 are dispersed in the liquid, and are moved under a voltage applied to the electrodes 5a and 5b to achieve a display.

Figure 2:
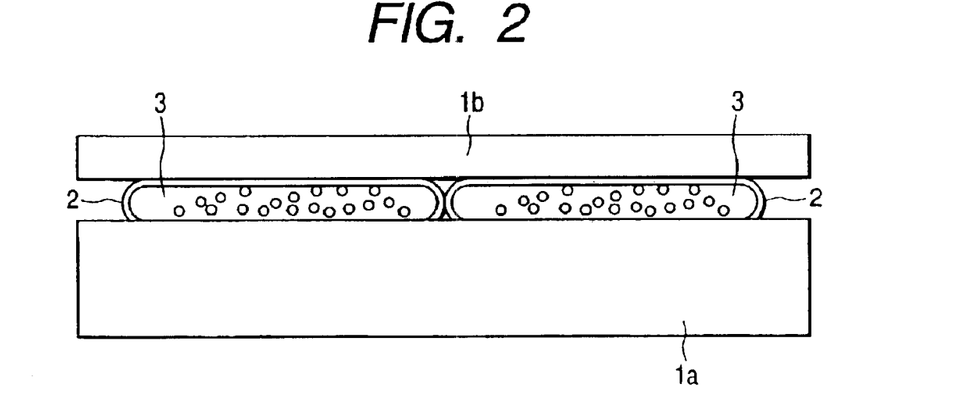
FIG. 2 is a cross-sectional view showing another configuration of the electrophoretic display device of the present invention.

It is also possible, as shown in FIG. 2, to provide a second substrate 1b with a predetermined gap to the first substrate 1a, thereby sandwiching the closed portion between the substrates 1a and 1b. Such positioning of the second substrate 1b allows to protect the film 2.

FIG. 2 shows a state in which the film 2 is deformed by pressing with the second substrate 1b. Such pressing with the second substrate 1b flattens a top portion of the film 2, thereby eliminating a gap between the film 2 and the substrate 1b, and expands the film 2 in the horizontal direction, whereby a gap between the film 2 and an adjacent film 2 containing the liquid 3 is made narrower and a thickness of the liquid 3 becomes more uniform. These changes generally provide improving effects on the characteristics of the display panel. Thus, by the positioning of the second substrate 1b as shown in FIG. 2, the thickness of the liquid 3 becomes substantially uniform and the display quality can be improved.

The aforementioned film 2 is provided in a plurality of units to form a plurality of closed portions, but all such films 2 need not be mounted on the substrate 1a and a part of the films 2 may be mounted on the second substrate 1b.

Also color filters may be provided in a vicinity of the closed portions to achieve a color display.

In case of positioning the second substrate 1b as explained above, it is preferred to provide a spacer (not shown) between the first substrate 1a and the second substrate 1b, thereby maintaining a constant and uniform gap between the substrates.

(2) In the Following, there will be Given Explanations on the Component Members.

(2-1) Substrate

The aforementioned substrates 1a and 1b have functions of forming a closed portion with the film 2 thereby holding the liquid 3, and of mechanically supporting the entire shape of the electrophoretic display device.

The substrates 1a and 1b (more exactly surface shape of the substrates) need not necessarily be flat but may be curved according to the purpose. It is also possible to employ a material having flexibility for the substrates, thereby obtaining a flexible electrophoretic display device.

A preferred range of a thickness of the substrates 1a and 1b is variable depending on a size of the electrophoretic display device (display panel), a strength and a use state of the substrate material, but is generally within a range from about 25 $\mu$m to 500 $\mu$m in case of a flexible compact panel and a range from about 100 $\mu$m to 2 mm in case of a large panel. The thickness of the substrate is selected according to a design of the display panel and a practical strength, and is not directly related to the constituting components of the present invention.

For the substrates 1a and 1b, there can be employed a ceramic material such as glass, alumina or quartz, a metal such as aluminum, titanium or stainless steel, or a plastic material such as polyethylene terephthalate (PET), polyethylene naphthalate (PEN), polyethersulfone (PES), polyimide (PI), polyetherimide (PEI) or polycarbonate (PC). In case it is difficult to secure a mechanical strength or a solvent resistance with a single material, there may be employed a composite material. For example, a reinforced plastic substrate can be obtained by molding a plastic material into a sheet shape with a filler such as a metal or ceramics. There can also be utilized a substrate with an improved liquid permeability which is obtained by coating a surface of a light-weight porous ceramic substrate with a plastic material, or a substrate with an improved solvent resistance which is obtained by covering a surface of a plastic film of inferior solvent resistance with a ceramic material.

At least either of the substrates 1a and 1b is made transparent in order that the liquid 3 can be observed from the exterior. It is preferable to form a surface hardening layer and an antireflective layer on such transparent substrate.

Also the substrate 1a shown in FIG. 1 conceptually includes the electrodes 5a and 5b and an insulating layer provided between such electrodes. Thus the substrate in the present embodiment conceptually includes a substrate formed by stacking the electrodes and the insulating layer, and a substrate formed of only the plastic material (without laminating the electrodes and the insulating layer).

(2-2) Film

The aforementioned film 2 serves to form a closed portion in cooperation with the substrate, thereby supporting the liquid 3 and the charged particles 4.

The film 2 can be formed from a polymer material which is impermeable to liquid (property not permeating liquid), and specific examples include polyamide resin, polyurethane resin, polyester resin, polyurea resin, polymelamine resin, epoxy resin or phenol resin or a mixed resin thereof. Such material is required to be insoluble in the liquid 3.

In case the second substrate 1b is not employed as shown in FIG. 1, the film 2 is required to have not only an impermeability to liquid and an insolubility in liquid but also a strength and a flatness, but, in case the second substrate 1b is employed as shown in FIG. 2, the film 2 is only required to meet the impermeability to liquid and the insolubility in liquid since the strength and the flatness can be borne by the second substrate 1b.

A thickness of the film 2 is limited by a mechanical strength thereof at the lower limit, which is about 0.1 $\mu$m though it is dependent on the material constituting the film. The thickness basically has no limitation as to an upper limit, which is generally up to about 100 $\mu$m in consideration of the designing, but may also be made larger without any problem.

Such film can be formed by a method of physically or chemically forming a film at an interface, by a method conventionally employed for preparing microcapsules. However, in the preparation of the microcapsules, a film is formed on the entire surface of a core material to be included in a microcapsule, but, in the present invention, a film is formed on a part of the liquid droplet positioned on the substrate 1a (or substrate 1b) whereby the liquid droplet is enclosed by the substrate and the aforementioned film.

The film can be formed, for example, by an in-situ method, an interfacial polymerization method or a liquid surface casting method.

Examples of the material for forming the film include urea resin, urea-formaldehyde resin, melamine-formaldehyde resin, polyurethane, polyurea-polyurethane, polyamide, polyester, polysulfonamide, polycarbonate, polysulfinate, polyepoxy, polyacrylate ester, polymethacrylate ester, polyvinyl acetate and gelatin.

In the following, specific examples of the formation of the film 2 will be explained. In the in-situ method, a monomer or a prepolymer for a polymer is supplied to the substrate 1a (or 1b) on which the liquid droplet is positioned, and a polymer is formed on the surface of the liquid droplet. In the interfacial polymerization method, a part of raw materials for a film-constituting polymer is included in advance in the liquid droplet, and the second part of the raw materials for the film-constituting polymer is supplied to the liquid droplet, thereby forming a polymer on the surface of the liquid droplet. In the liquid surface casting method, a solution of a film-forming material in a suitable solvent is supplied to the substrate on which the liquid droplet is positioned, thereby depositing the film-forming material on the surface of the liquid droplet.

In the in-situ method, the film 2 can be formed in a following manner. At first, on an insulating substrate bearing a predetermined electrode pattern, a liquid droplet constituted by predetermined amounts of charged particles 4 and liquid 3 is applied in a predetermined position. The particles 4 and the liquid 3 may be applied onto the substrate either simultaneously, or in succession in the order of the particles 4 at first and the liquid 3 later or the liquid 3 at first and the particles 4 later. Such application can be made, for example, by a printing method such as an ink jet printing method or an electrostatic printing method, but such methods are not restrictive. There can also be employed a method of applying a material of poor liquid wettability in a pattern on the substrate surface, and contacting such surface with the liquid 3, thereby selectively applying the liquid 3 in an area where such pattern is absent. Then a liquid containing a film-forming material is brought into contact with the aforementioned substrate, thereby forming a film at the interface with the liquid 3 on the substrate. Such liquid containing the film-forming material is required to be capable of forming an interface in contact with the liquid 3 without mixing therewith. Since mostly the liquid 3 to be explained later is difficultly miscible with water, the liquid containing the film-forming material can be an aqueous solution of the film-forming material. For example, a film comprising urea resin as a component can be formed by employing an aqueous solution containing urea and formaldehyde as the film-forming materials and ethylene-maleic anhydride resin as a catalyst for forming the urea resin and maintaining such solution at a predetermined temperature. Also a film formed from resorcin resin, phenolic resin or polyurethane resin can be prepared in a similar manner.

In the interfacial polymerization method, the film 2 can be formed in a following manner. As explained in the foregoing, on an insulating substrate bearing a predetermined electrode pattern, a liquid droplet constituted by predetermined amounts of charged particles 4, a liquid 3 and a first film-forming is applied in a predetermined position. Then a liquid containing a second film-forming material is brought into contact with the aforementioned substrate, thereby forming a film at the interface with the liquid 3 on the substrate. The first film-forming material and the second film-forming material cause a film formation upon mutual contact. The first film-forming material is soluble in oil, and can be, for example, a substance having a plurality of portions capable of executing a condensation reaction with a compound having an active hydrogen, such as a polyisocyanate or a polycarboxylic halide. The second film-forming material can be a substance capable of forming a film by reacting with the first film-forming material and having a plurality of active hydrogens, such as a polyhydric alcohol or a polyvalent amine. According to a combination of the first film-forming material and the second film-forming material, there is formed polyurethane resin, polyurea resin, polyester resin, polyamide resin, etc. is formed as a film on the surface of the liquid 3.

Figure 3A:
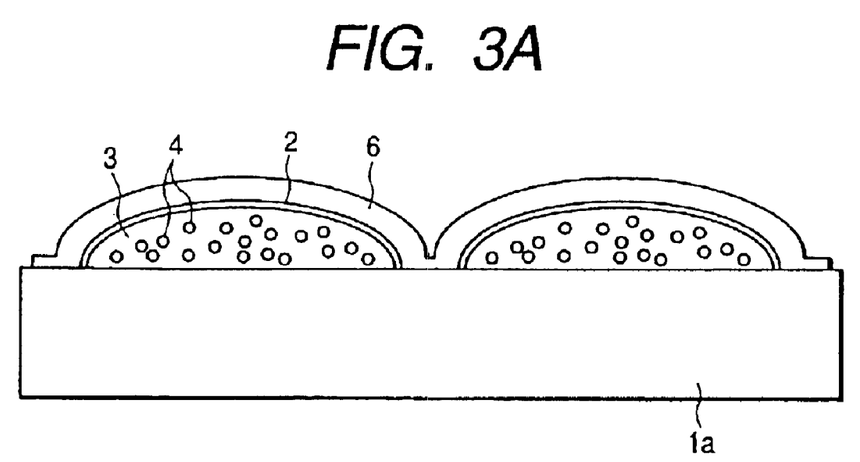
FIGS. 3A and 3B are cross-sectional views showing still another configuration of the electrophoretic display device of the present invention.

Also, as indicated by a numeral 6 in FIG. 3A, the film 2 may be covered with a surface protective layer 6. For such surface protective layer 6, there is preferred a material having a strength an impermeability to liquid and a transparency equal to or superior to those of the film 2, such as acrylic resin or epoxy resin. Also in case a hardness is required for the surface of the device, there may be provided an outermost hardened layer formed by depositing an inorganic coated layer such as of ceramics or a resin layer containing inorganic particles. Also there may be provided an antireflective effect by a refractive index matching with the air or by an optical interference structure for reducing the reflection on the panel surface, thereby improving the visibility of the display.

Figure 3B:
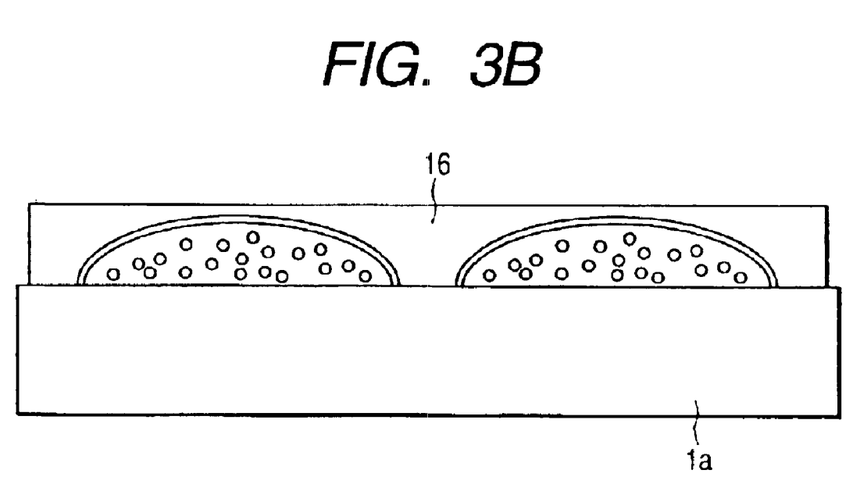

Such surface protective layer is preferably formed, as indicated by a numeral 16 in FIG. 3B, with a flat structure at the surface (upper surface in FIG. 3B). Such structure provides advantages of reducing a possibility of damage to the surface protective layer and facilitating removal of smear. Such surface protective layer can be formed with a commercially available resin of a satisfactory leveling property.

(2-3) Liquid

The liquid 3 can be a liquid capable of dispersing the charged particles 4, and specific examples of such liquid include an aliphatic hydrocarbon such as cyclohexane, heptane, decane, kerosene, decaline or an isoparaffin hydrocarbon; an aromatic hydrocarbon such as toluene, xylene, ethylbenzene, cumene, cymene, diamylbenzene, tetraline, or solvent naphtha; a halogenated hydrocarbon such as 2-ethylhexyl chloride, trichloroethane, ethylene chloride, tetrachloroethylene, dichlorobenzene, trichlorotrifluoroethane, carbon tetrachloride, or tetrachlorodifluoroethane; an alcohol such as 2-propanol, butanol, 3-pentanol, 3-heptanol, 2-methylcyclohexanol or benzyl alcohol; an ether such as butyl ether, hexyl ether, anisole, cresyl methyl ether or dioxane; a ketone such as 2-butanone, 2-methyl-4-pentanone, 3-heptanone, 2,6-dimethyl-4-heptanone or cyclohexanone; an ester such as amyl formate, propyl acetate, isoamyl acetate, 2-ethylhexyl acetate, isoamyl propionate, diethyl oxalate, diethyl malonate, benzyl acetate, methyl benzoate or ethyl benzoate; an oil such as oleic acid, silicone oil, olive oil, palm oil, linseed oil or liquid paraffin; or an arbitrary mixture thereof.

In such liquid 3, there may be added, if necessary, a charge controlling agent, a particle dispersant, a specific gravity adjusting agent, a coloring agent, a viscosity regulating agent, etc.

Among these, the charge controlling agent and the particle dispersant are added for a purpose of stably dispersing the charged particles 4 in the liquid 3. The charge controlling agent charges the particles and has an effect of preventing coagulation of the particles by an electrostatic repulsive force among the particles, and the particle dispersant is adsorbed on the surface of the particles and has an effect of preventing coagulation of the particles by avoiding direct contact of the particles.

Examples of the charge controlling agent include a fatty acid salt such as cobalt naphthenate, manganese naphthenate, zirconium octylate, cobalt stearate, or cobalt ethylenediamine tetraacetate; a sulfonic acid salt or a sulfuric acid salt such as calcium nonylphenylsulfonate, sodium dioctylsulfonate, calcium dioctylsulfonate, sodium bis (2-ethylhexyl)sulfosuccinate, copper dodecylsulfonate, or nickel dodecylsulfonate; a phosphoric acid compound such as zinc phosphate, diparmitoylphosphatidyl chlorine or diparmitoylphosphatidyl serine; an amine such as hexadecyltrimethylammonium bromide, or dioctadecyldimethylammonium choline; an alkylenesuccinic imide such as polyaminopolybutenylsuccinic imide; or a fatty acid resin such as rosin-denatured maleic acid resin or ethylene-maleic anhydride copolymer.

Examples of the particle dispersant include a polymer such as paraffin wax, an ethylene oxide-propylene oxide copolymer, or polyoxyethylene nonyl phenyl ether.

The charge controlling agent and the particle dispersant often provide a satisfactory result when used in combination, but either one alone may also be employed. Also depending on the materials constituting the liquid 3 and the charged particles 4 to be explained later, the particles 4 may have an appropriate charge in the liquid 3 without addition of any charge controlling agent.

(2-4) Charged Particles

The charged particles 4 are particles having a charge and capable of executing electrophoresis in the liquid 3 under an electric field.

The charged particles 4 can be any one of:
(a) particles of an insoluble colored material;
(b) insoluble particles colored with a coloring material; and
(c) above-mentioned particles subjected to a surface treatment for stabilizing dispersion.

Examples of the insoluble colored material employable as the charged particles 4 include a black pigment such as C. I. pigment black 1, 7, or molybdenum sulfide; a white pigment such as C. I. pigment white 6 or 18; a red pigment such as C. I. pigment red 122, 123, 149, 168, 177 or 178; a green pigment such as C. I. pigment green 7, 18 or 36; a blue pigment such as C. I. pigment blue 15, 27, 28 or 60; a yellow pigment such as C. I. pigment yellow 53, 95, 97 or 110; a red-purple pigment such as C. I. pigment violet 16, 19 or 23; a blue-green pigment such as C. I. pigment blue 2, 16 or C. I. pigment green 4.

The coloring material for coloring the insoluble particles can be a dye in addition to the pigments mentioned above. Examples of the carrier particles (insoluble particles) include particles of an inorganic material such as glass, hollow glass, silica, magnesia, alumina or zeolite; particles of a polymer having a residue of a non-polar monomer such as polyethylene, polypropylene or polystyrene; particles of a polar polymer having a residue of a polar monomer such as polyacryl resin, polymethacryl resin, polyester resin or polyamide resin; particles of an acidic polymer having a residue of an acidic monomer or a salt thereof such as acrylic acid, methacrylic acid, or styrenesulfonic acid; particles of a basic polymer having a residue of a basic monomer or a salt thereof such as dimethylaminoethyl methacrylate, allylamine, ethyleneimine or vinylpyridine; or particles of a copolymer of such polymers. The particles of the aforementioned polymer may be subjected to an internal crosslinking or a mixing of an inorganic filler, for the purpose of improving a dimensional stability, an abrasion resistance or a solvent resistance.

For the coloring agent to be borne by such carrier particles, there can be utilized the aforementioned pigments or a dye which can be adsorbed or included in such carrier particles.

For coloring the aforementioned inorganic particles, there can be employed a dye such as C. I. direct black 17, C. I. direct yellow 44, C. I. direct red 23, 79, C. I. direct blue 15, 86, C. I. direct green 59, etc. Also for coloring the aforementioned polymer particles, there can be employed a dye such as C. I. solvent orange 5, 45, C. I. solvent blue 25, C. I. basic yellow 28, C. I. basic red 14, 18, C. I. basic violet 7, C. I. basic blue 3, C. I. acid black 52, C. I. acid yellow 38, C. I. acid red 18, C. I. acid violet 49, C. I. acid blue 83, 113, C. I. acid green 25, C. I. reactive black 5, C. I. reactive yellow 2, C. I. reactive red 3, 43, C. I. reactive blue 2, 5, 19, etc.

Also by coating the aforementioned pigment particles (charged particles formed of insoluble coloring material), there can be prepared:
(a) particles with adjusted dispersibility in liquid and charging characteristics; or
(b) particles capable of preventing transfer of the coloring agent from the particles 4 to the liquid 3; and such particles can also be advantageously employed in the present invention. Examples of a material usable for such coating include a polymer having a residue of a non-polar monomer such as polyethylene, polypropylene or polystyrene; a polar polymer having a residue of a polar monomer such as polyacryl resin, polymethacryl resin, polyester resin or polyamide resin; an acidic polymer having a residue of an acidic monomer or a salt thereof such as acrylic acid, methacrylic acid, or styrenesulfonic acid; a basic polymer having a residue of a basic monomer or a salt thereof such as dimethylaminoethyl methacrylate, allylamine, ethyleneimine or vinylpyridine; or a copolymer of such polymers. Such polymer can be suitably selected according to the type of the liquid in which the particles are dispersed.

As the aforementioned coloring agent, there can also be utilized particles having dispersibility in liquid and charging characteristics which are adjusted by reacting a surface modifying agent such as an alkyl silane compound, a fluorinated alkylsilane compound or an alkyltitanium compound with the aforementioned pigment particles (charged particles formed of an insoluble coloring material) or particles obtained by coating the pigment particles.

(2-5) Electrode

The electrodes 5a and 5b in FIG. 1 are provided along a substrate 1a, but, in the electrophoretic display device shown in FIG. 2, they may be respectively provided on the substrates 1a and 1b (so as to sandwich the liquid 3).

(2-6) In the Following, there will be Explained Colors of the Charges Particles 4 and the Electrodes 5a and 5b.

Figure 4A:
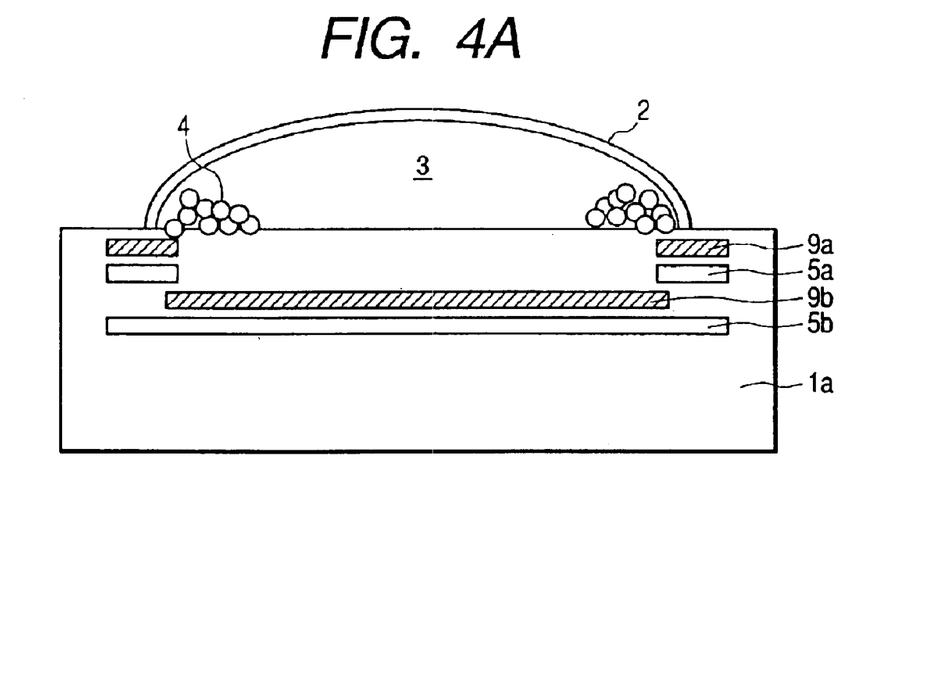
FIGS. 4A and 4B are cross-sectional views showing still another configuration of the electrophoretic display device of the present invention.

When one electrode 5a is maintained at a polarity opposite to that of the charged particles 4 and the other electrode 5b is maintained at the same polarity as that of the charged particles 4, the charged particles 4 moves to a vicinity of the electrode 5a as shown in FIG. 4A. On the other hand, by maintaining the one electrode 5a at the same polarity as that of the charged particles 4 and maintaining the other electrode 5b at a polarity opposite to that of the charged particles 4, the charged particles 4 moves so as to cover the electrode 5b as shown in FIG. 4B.

Figure 4B:
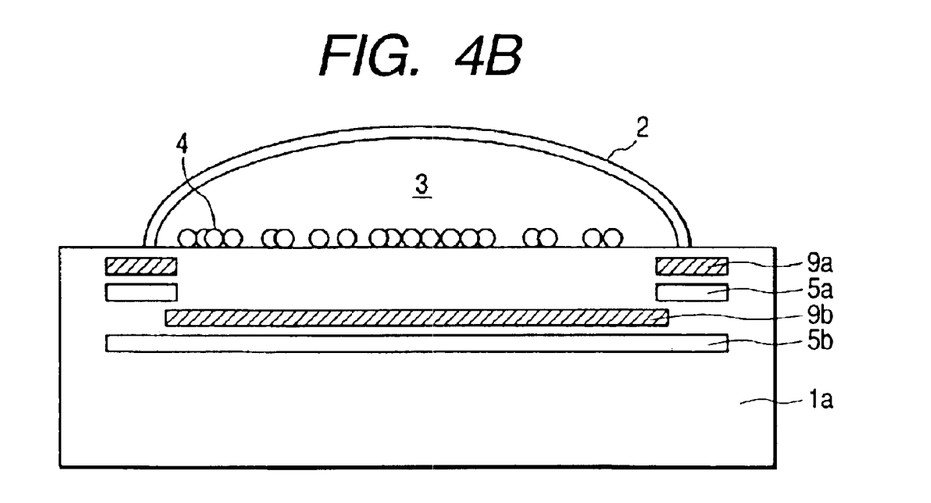

By employing the charged particles 4 of black color and forming a white colored layer 9b so as to cover the electrode 5b, a white color is displayed in the state of FIG. 4A as the colored layer 9b is observable, while a black color is displayed in the state of FIG. 4B as the charged particles 4 are observed. A gradational gray display is also possible since an intermediate state between FIG. 4A and FIG. 4B by controlling a magnitude or an application time of the voltage applied to the electrodes.

Also by employing the colored layer 9b of another color, such color is displayed in the state of FIG. 4A and black color is displayed in the state of FIG. 4B. A pixel capable of multi-color display can be obtained by arranging as one unit a plurality of display devices having the colored layers 9b of mutually different colors. In the plurality of display devices constituting the aforementioned pixel, the-color of the colored layers 9b may be selected respectively as red, green and blue or cyan, magenta and yellow, thereby obtaining a pixel capable of displaying a mixed color by three primary colors. Also a color display panel can be obtained by arranging a plurality of such color display device on a plane.

It is also possible to obtain a display device by employing the charged particles 4 of white color. In case of forming a black-and-white display device with the white charged particles, the color of the colored layer 9b is preferably black.

Also there can be obtained a pixel capable of displaying a color in different tones, by employing the charged particles 4 of a desired color and employing a colorless white, black or gray layer for the colored layer 9b.

In any configuration, it is possible to improve an apparent display contrast of a pixel, by forming a colored layer 9a of a color similar to that of the charged particles 4.

The colored layer 9a may be so provided as to cover the electrode 5a. Such colored layers 9a and 9b are only required to cover the electrodes 5a and 5b, respectively, and the colored layer 9a and the electrode 5a (or the colored layer 9b and the electrode 5b) may be in mutual contact or not.

In case the apparent color of the substrate surface and the color of the charged particles 4 are different, the colored layers 9a and 9b may be dispensed with since a color change can be observed by varying the distribution of the charged particles 4. Also by employing a substrate provided with a metal electrode as the electrode 5b and covered with a transparent insulating layer, there can be obtained a display device in which a reflection on the metal surface is controlled by the distribution of the charged particles 4. Also by employing a transparent substrate provided with a transparent electrode as the electrode 5b and covered with a transparent insulating layer, there can be obtained a display device in which a transmitted light is controlled by the distribution of the charged particles 4.

In case the closed portion is provided in a plurality of units, the colors of the colored layer 9b and the charged particles 4 may be changed for each closed portion.

(2-7) In the Following, there will be Explained an Arrangement of the Film 2 and a Shape of the Electrodes.

FIG. 1 or 2 illustrates two films (pixels) 2, but such configuration is naturally not restrictive, and there may be provided three or more films. In such case, the films may be arranged in one row or in a plurality of rows (namely two-dimensionally).

Figure 5A:
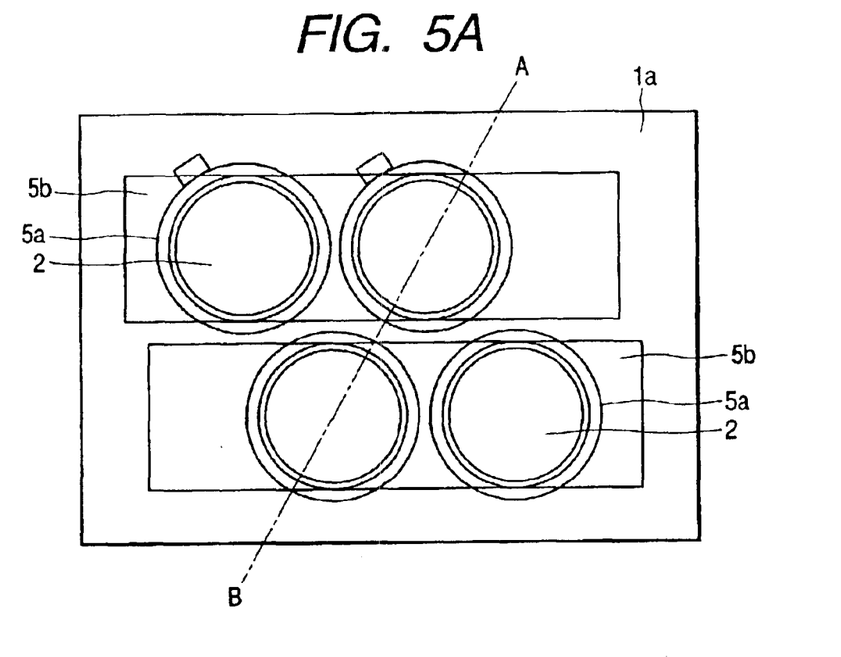
FIGS. 5A and 5B are views showing a shape of electrodes, etc.
Figure 5B:
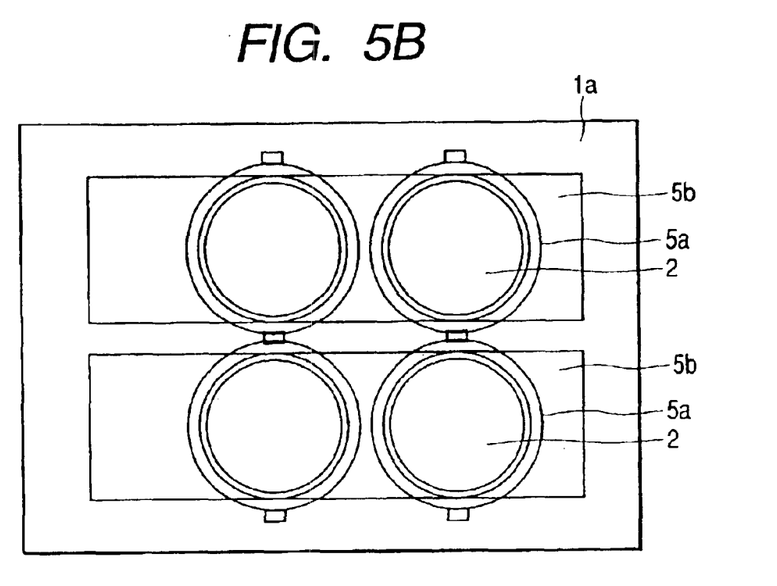

FIGS. 5A and 5B show examples in which four films 2 are arranged in two rows, wherein FIG. 5A shows an arrangement of the display pixels in a hexagonal symmetry while FIG. 5B shows an arrangement of the display pixels in a rectangular symmetry. In the pixel arrangement shown in FIG. 5B, the display on the electrophoretic display device can be controlled by a matrix driving in an X-Y orthogonal coordinates. A cross section along the line A-B of FIG. 5B corresponds to FIG. 1.

In FIGS. 5A and 5B, the electrode 5a is formed as a circle, but such shape is naturally not restrictive. A polygonal shape of the electrode 5a, such as a hexagon or a square allows to reduce an area ineffective for display between the adjacent pixels, thereby leading to an improvement in the display contrast.

Since FIGS. 5A and 5B show a configuration with circular electrodes, the film 2 formed on the substrate is shown in a shield shape (a shape obtained by cutting a sphere with a plane), but such shape is not restrictive. It may be in any shape, including a polygonal shape, along the surface of the substrate, as long as it does not overlap with an adjacent pixel. In case of employing an electrode of a polygonal shape such as hexagon or square, the film 2 may be advantageously formed into a polygonal shape such as hexagon or square, along the surface of the substrate.

In FIGS. 5A and 5B, the electrode 5b is used in common between the two adjacent pixels, but, also in such configuration, the displays of the adjacent two pixels can be separately controlled by controlling the voltages applied to the electrodes 5a. It is naturally possible to extract the respective electrodes from the pixels or to connect the electrode in common between the adjacent pixels.

(3) Method for Producing Electrophoretic Display Device

FIGS. 6A through 7B show an example of steps for producing the electrophoretic display device of the present invention. The method of producing the electrophoretic display device of the present invention includes:

a step of forming, on a surface of a first substrate 1a, a region of a higher affinity to the liquid 3 and a region of a lower affinity;

a step of forming a droplet of the liquid 3, in which the charged particles 4 are dispersed, in the region of the high affinity; and a step of forming a film 2 on a surface of the liquid droplet not in contact with the substrate.

Figure 6A:
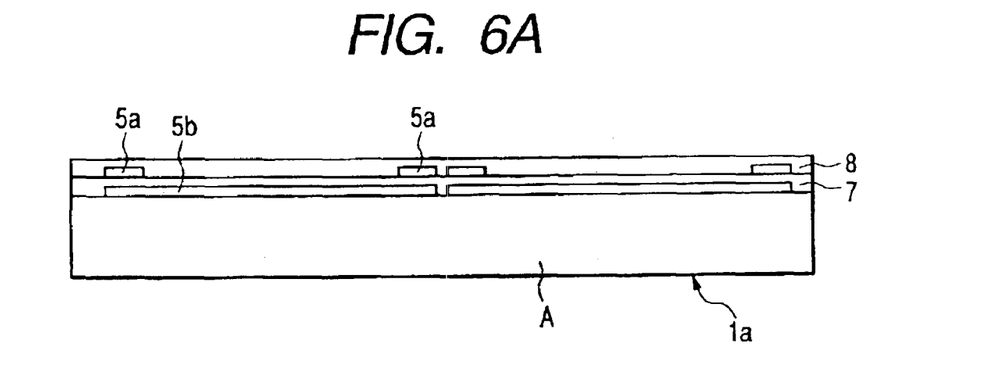
FIGS. 6A, 6B and 6C are schematic views showing an example of a producing method for the electrophoretic display device of the present invention.
Figure 6B:
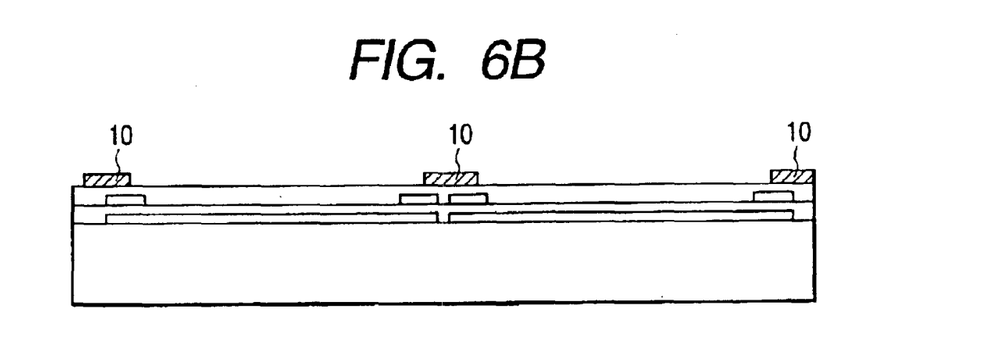

FIG. 6A shows a state in which a layer of a material of a higher affinity is formed on the substrate 1a. FIG. 6B shows a state in which a material of a lower affinity is patterned thereon, whereby there are formed, as shown in FIG. 6B, a region of a higher affinity (layer of the material of higher affinity being exposed) and a region 10 of a lower affinity.

Since the region of the higher affinity is to be subjected to an arrangement of the liquid 3 and a formation of the film 2 as will be explained later thereby constituting a closed portion, it is preferably surrounded by a region of a lower affinity for each pixel unit.

Figure 6C:
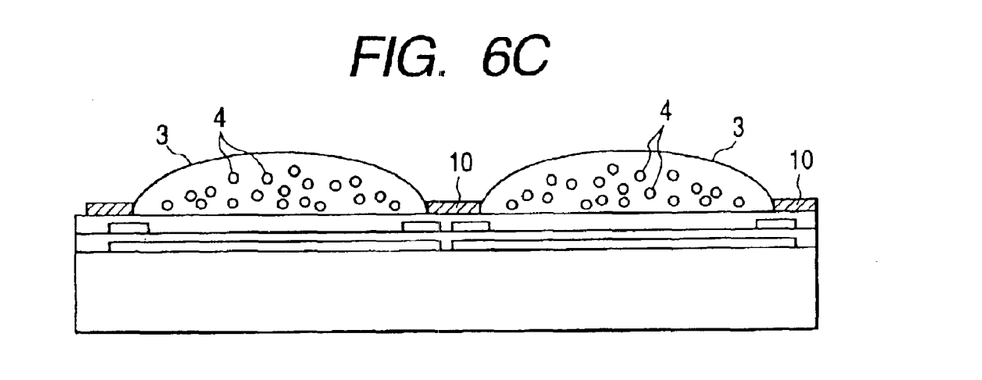

The liquid 3 is positioned on such substrate. As will be explained later, the liquid 3 can be positioned in various methods, and in any method, the liquid 3 is spread on and uniformly wets the region of a high affinity, while the liquid 3 is repelled upon reaching a region of a lower affinity and is no longer spread. As a result, the liquid 3 forms a liquid droplet only in a region of a higher affinity as shown in FIG. 6C. Then a liquid 11 containing a film-forming material is positioned thereon (FIG. 7A) whereby the film 2 is formed at the interface (FIG. 7B).

(3-1) In the Following, there will be Explained a Method Positioning the Liquid 3 and the Charged Particles 4.

It is preferred to form in advance "a region having a higher affinity to the liquid 3" and "a region having a lower affinity" on the substrate surface and to position the liquid 3 and the charged particles 4 in the "region of a higher affinity".

For forming "a region having a higher affinity to the liquid 3" and "a region having a lower affinity" on the substrate surface, there is preferred a method of employing a substrate of "a material having a higher affinity to the liquid 3" and to form "a layer having a lower affinity" partially on the substrate surface. Such "layer having a lower affinity" may be formed by:

(a) partially positioning another material (affinity controlling material) different from the substrate; or (b) physically or chemically modifying a part of the substrate (or an insulating layer 8 formed on the substrate).

For the producing steps shown in FIGS. 6A through 7B, an acrylic resin 8 is formed on the surface of the substrate 1a in the step shown in FIG. 6A, and a polymer layer 10 containing water is formed in the step shown in FIG. 6B. As a result, in a stage shown in FIG. 6B, there are formed a region of the exposed acrylic resin which is higher in affinity to the liquid 3, and a region of the water-containing polymer present at the uppermost surface which is lower affinity to the liquid 3.

Examples of the affinity controlling material include a particularly low surface energy polymer, which contains as a main component a fluororesin such as tetrafluoroethylene and a hydrophilic polymer, which contains as a main component a polyalcohol such as polyvinyl alcohol or polyhydroxyethyl methacrylate; an acrylamide such as polyacrylamide or poly-N-methylacrylamide; a polycarboxylic acid or a salt thereof such as polyacrylic acid or polymethacrylic acid; a polysaccharide such as gum Arabic or carboxymethyl cellulose. Such material can be provided in a pattern by an ordinary printing process, or by an optical patterning with an introduction of a photocrosslinking property or a photosolubility.

Examples of the physical or chemical method for surface modification include a method of oxidizing a surface layer of a region to be treated, such as a method of contacting a liquid including an oxidant such as a fluorinated silane, hydrogen peroxide, a peracetate salt, a perborate salt or a percarbonate salt, a method of contacting an oxidizing gas such as ozone, and a method of ultraviolet irradiation in an appropriate atmosphere. Also there can be effectively employed a method of contacting an acid or alkali solution to execute a hydrolysis or a solvolysis of a surface layer of a region to be treated, or a method of forming a hydrophilic resin in a region to be treated by a combination of an electron beam, an ultraviolet light, an oxidant or a radical generating agent with a polymerizable precursor or a reactive oligomer.

In case a hydrophilic pattern is formed as the layer of lower affinity, the affinity may be further lowered by providing such hydrophilic pattern with water.

The affinity of the aforementioned pattern to the liquid can be evaluated by a contact angle of the aforementioned liquid on such pattern surface. In the present invention, a low affinity means that the aforementioned contact angle is 10° or more. In case of a smaller contact angle, it becomes difficult to form liquid droplets of a size sufficient for the display operation, independently on the pixels of the substrate.

For forming "a region having a higher affinity to the liquid 3" and "a region having a lower affinity" on the substrate surface, there is also preferred a method of employing a substrate of "a material having a lower affinity to the liquid 3" and forming "a layer having a higher affinity" partially on the substrate surface. Such "layer having a higher affinity" may be formed by:
(a) partially positioning another material (hydrophobic material) different from the substrate; (see numeral 10 of FIG. 6B) or
(b) physically or chemically modifying a part of the substrate (or an insulating layer 8 formed on the substrate).

The above-mentioned hydrophobic material can be a hydrophobic resin such as a polystyrene, a polyacryl ester, a polyalkene or a mixture thereof.

Then the liquid 3 and the charged particles 4 are dropped to the "region of higher affinity" (see FIG. 6C). The liquid 3 and the charged particles 4 may be positioned on the surface of the first substrate 1a through a nozzle. The liquid 3 and the charged particles 4 may be dropped either in a state where the charged particles 4 are dispersed in the liquid 3, or separately. Such dropping can be achieved by an ordinary liquid coating method such as dipping, brush coating, spin coating, spray coating, or ink jet coating. In case the charged particles 4 are provided at a timing different from that for the liquid 3, the charged particles 4 may be dropped after mixing with an appropriate vehicle. They may also be applied, without employing such vehicle, by an powder coating method such as an electrostatic coating method.

In case an amount of the applied liquid on the substrate is excessively large, the applied liquid droplet spreads to a hydrophilic region. Consequently, the amount of the liquid should be such that the liquid droplet does not spread beyond the hydrophilic pattern. The amount of the applied liquid can be regulated by providing a predetermined sufficient amount of the liquid in an applying step, or by a step of removing an excessive liquid after applying an amount larger than a sufficient amount.

In the aforementioned liquid droplet forming step, there may be provided liquids of two or more kinds.

(3-2) In the Following, there will be Explained a Method of Forming the Electrodes 5a and 5b.

The electrodes 5a and 5b may be formed by a known method, such as a screen printing method or a method employing a combination of a photoresist and an etching.

(3-3) In the Following, there will be Explained a Method of Providing the Film 2.

Then the film 2 is formed on the surface of the liquid 3. The film can be formed, for example, by:
(a) a method of applying a film material on the surface of the liquid 3; or
(b) a method of forming a film (by a reaction of raw materials) on such surface.

In the former method (method of applying a film material on the surface of the liquid 3), there can be employed a method of melting a film material into a liquid state or dissolving such material in a solvent to obtain a liquid state, and applying the surface of the liquid 3 with a fine-particles-containing liquid. In case of dissolving the film material in the solvent, the solvent is dissolved into the liquid 3 or evaporates into the air, whereby the film material alone is extracted.

Examples of the film material that can be applied on the surface of the liquid 3 coated include a vinylic polymer such as polystyrene, an acrylonitrile-styrene resin, polyvinyl formal, polyvinyl acetal, an acrylic resin or polyvinyl acetate.

The aforementioned method of forming the film material on the surface is executed by supplying a raw material of a polymer that can constitute the film material, namely a monomer or a reactive oligomer of the polymer, thereby generating a polymer as a film on the surface of the applied liquid droplet.

Examples of a raw material for the aforementioned polymer include a polyvalent amine such as urea, melamine, ethylenediamine, or diethylenetetramine; a combination of formaldehyde and a phenol such as phenol or resorcin; or a combination of a polyamine such as tetramethylenediamine, hexamethylenediamine, metaxylylenediamine, polyethyleneimine or polyallylamine or a polyalcohol such as ethylene glycol, 1,4-butanediol, glycerin, pentaerythritol or polyvinyl alcohol and a polybasic acid halide such as succinic chloride, adipic chloride, sebacic chloride, terephthalic chloride or isophthalic chloride, a polyisocyanate such as trilene diisocyanate, hexamethylene diisocyanate, isophorone diisocyanate, Takenate D-110N, Takenate D-160N, or Takenate D-170N (Takenate is a trade name of Takeda Pharmaceutical Industries Ltd.), a polyhaloformate or a polyepoxide, or a mixture thereof.

Now a detailed explanation will be given on chemical generation of a polymer film. For forming a polymer film from a combination of a polyvalent amine or a phenol and formaldehyde, an aqueous solution of a polyvalent amine or a phenol or a mixture of a polyvalent amine and a phenol is brought into contact, in the presence of an acidic polymer, with the substrate bearing thereon an applied liquid droplet to be coated with the film, and such solution is heated in the presence of formaldehyde therein.

The acidic polymer is adsorbed to the interface between the applied liquid droplet which is an organic liquid and the above-mentioned aqueous solution, and functions, by the acidity of the polymer, as a catalyst for a condensation reaction between formaldehyde and polyvalent amine or phenol, thereby accelerating a polymer forming reaction at the surface of the applied liquid droplet.

Examples of the acidic polymer usable for the above-described purpose include poly(styrene-styrensulfonic acid) and poly(ethylene-maleic anhydride).

Also in order to form a polymer film in a combination of a polyamine or polyalcohol and a polybasic acid halide, a polyisocyanate, a polyhaloformate or a polyepoxide, the liquid droplet is made to contain a polybasic acid halide, a polyisocyanate, a polyhaloformate, a polyepoxide or a mixture thereof and is contacted with an aqueous solution of a polyamine, a polyalcohol or a mixture thereof, whereby a polymer forming reaction is induced at the surface of the liquid droplet.

In case of employing a polybasic acid halide, in order to neutralize and eliminate hydrogen halide generated as a by-product in the polymer generating reaction, a base may be included in the aforementioned aqueous solution of polyamine or polyalcohol.

After the formation of the film 2, the residue at the film formation may be removed if necessary by a suitable washing operation.

Also if a surface protective layer is necessary, there may be applied a coating of a two-liquid setting resin, an ultraviolet setting resin or an inorganic material (see FIGS. 3A and 3B).

Also there may be provided a second substrate 1b as shown in FIG. 2.

In the following there will be explained effects of the present embodiment.

According to the present embodiment, the film 2 can prevent leakage of the liquid 3 and the charged particles 4.

Also in the present embodiment, it is not necessary to arrange a spacer for maintaining a uniform gap between the substrates, or a partition member for avoiding movement of the charged particles from a pixel to another pixel. Consequently there will be no loss of the optical aperture rate resulting from the presence of such spacer or partition member.

Also the production method is made simpler since the microcapsules as used in the conventional example 1 or 2 are not employed.

Furthermore, in case of forming "a region of a higher affinity to the liquid 3" and "a region of a lower affinity" are formed on the substrate surface by the aforementioned method, it is possible to exactly match the position of the electrodes 5a and 5b and that of the liquid 3.

Also in case of forming the film 2 in the aforementioned method, it is possible to reduce the inclusion of bubbles in the liquid 3.

As explained in the foregoing, the present invention can prevent leakage of the liquid 3 and the charged particles 4.

Also the present invention does not require a spacer for maintaining a uniform gap between the substrates, or a partition member for avoiding movement of the charged particles from a pixel to another pixel. Consequently there will be no loss of the optical aperture rate resulting from the presence of such spacer or partition member.

Also the production method is made simpler since the microcapsules are not employed.

Furthermore, in case of forming "a region of a higher affinity to the liquid 3" and "a region of a lower affinity" are formed on the substrate surface by the aforementioned method, it is possible to exactly match the position of the electrodes and that of the insulating liquid.

In the following, the present invention will be further clarified by examples.

EXAMPLE 1

In this example, a display panel (electrophoretic display device) of a configuration shown in FIG. 1 was prepared according to a process shown in FIGS. 6A through 7B.

More specifically, as a substrate A, there was employed a polyester substrate of a thickness of 0.2 mm covered with acrylic resin of a thickness of about 1 $\mu$m, and an aluminum film of a thickness of 400 nm was formed thereon. The aluminum film was coated with a photoresist and was patterned by etching off unnecessary portions to form a display electrode 5b of a width of 100 $\mu$m. Then it was coated with a thermosetting acrylic resin of a thickness of about 3 $\mu$m, in which fine alumina particles were dispersed, thereby forming a white insulating layer (see numeral 7 of FIG. 6A). Then titanium in a thickness of 400 nm and a photosensitive acrylic resin, in which black carbon pigment was dispersed, in a thickness of 1 $\mu$m were deposited and patterned to form a collector electrode 5a of a width of 12 $\mu$m, covered with a black layer. Then the entire surface was covered with a thermosetting transparent acrylic resin 8.

Then, on the surface of the acrylic resin 8, a photosensitive liquid (constituted by 2 parts by weight of ammonium bichromate, 6 parts by weight of casein, 100 parts by weight of water and 1 part by weight of a 28% ammoniac water) was applied, dried, patterned by exposure and washed to form a hydrophilic region. For increasing the hydrophilicity, a 20% aqueous solution of gum Arabic was applied to the region and let to stand for a while.

Then a particle dispersion liquid was prepared by dispersing crushed poly(acryl-styrene) particles (4 parts by weight), which include black pigment, as the charged particles in a liquid mixture of 50 parts by weight of Isopar H (Exxon) and 0.05 parts by weight of zirconium octylate, and adding 2 parts by weight of sebacic chloride.

A small amount of water was applied on the surface of the aforementioned substrate, and, after a standing for about 5 seconds, the above-mentioned particle dispersion liquid was applied to form a liquid droplet in a position surrounded by the hydrophilic region (see FIG. 6C).

Figure 7A:
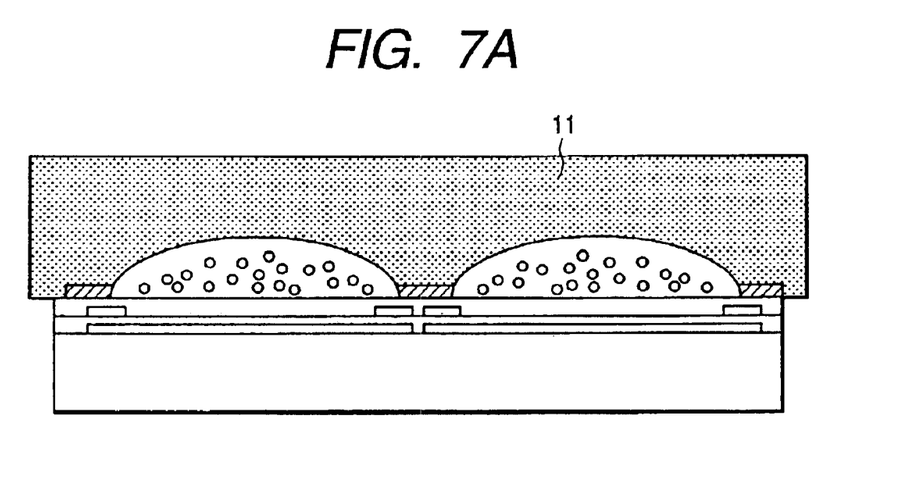
FIGS. 7A and 7B are schematic views showing an example of a producing method for the electrophoretic display device of the present invention.
Figure 7B:
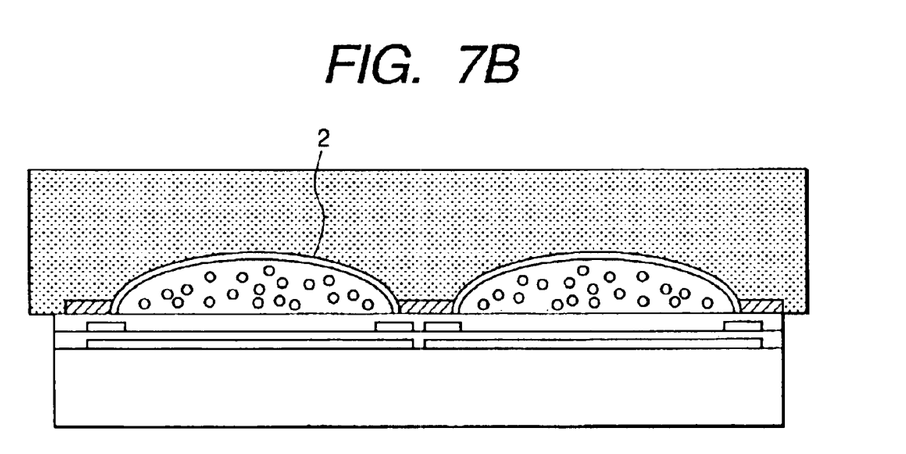

Then, at the room temperature, the aforementioned substrate was gently contacted with an aqueous solution 11 constituted by 10 parts by weight of polyallylamine, 3 parts by weight of ethylene glycol, 1 part by weight of sodium carbonate and 60 parts by weight of water (see FIG. 7A). At a stage where the film 2 was formed, the heating was conducted for 30 minutes at 45° C. in order to complete the reaction (FIG. 7B). Then washing with cold water was conducted to complete the electrophoretic display device.

Under application of a DC voltage of 40 V between the electrodes 5a and 5b, the charged particles 4 moved toward the positive electrode (at this time, the charged particles 4 was charged negatively). By inverting the polarity of the applied voltage, the charged particles 4 moved as shown in FIG. 4A or 4B. It was thus confirmed that a black-and-white display was possible. A similar display operation was confirmed by a repeated voltage application after 8 hours.

EXAMPLE 2

A hydrophilic region was formed by employing polyvinyl alcohol bichromate photosensitive liquid instead of casein bichromate in Example 1. Other conditions were made the same as in Example 1 to produce an electrophoretic display device.

EXAMPLE 3

An electrophoretic display substrate with hydrophilic region on the surface was produced in the same manner as in Example 1, except for using, as the photosensitive agent, an aqueous solution prepared by 1 part by weight of ammonium bichromate, 3 parts by weight of PVA (polymerization degree of 500) and 50 parts by weight of water.

A particle dispersion liquid was prepared by dispersing crushed poly(acryl-styrene) particles (4 parts by weight), which include black pigment, as the charged particles in a liquid mixture of 50 parts by. weight of Isopar H (Exxon) and 0.05 parts by weight of zirconium octylate, and adding 5 parts by weight of hexamethylene diisocyanate trimer (Takenate D-170HN, manufactured by Takeda Pharmaceutical Industries Ltd.).

A small amount of water was applied on the surface of the substrate, and, after a standing for about 5 seconds, the above-mentioned liquid (insulating liquid in which the particles 4 were dispersed) was dropped. In this manner, a liquid droplet was provided in a position surrounded by the hydrophilic region (see FIG. 6C).

Then, the aforementioned substrate was gently contacted with a liquid prepared by 92 parts by weight of water saturated with Isoper H and containing 8 parts by weight of acetacetyl-denatured partially saponified polyvinyl alcohol (Gosefimer Z-210, manufactured by Nippon Gosei Kagaku Co.) (see FIG. 7A).

Then heating was conducted for 8 hours at 80° C. in order to complete the reaction (FIG. 7B). Then washing with cold water was conducted.

A black-and-white display operation was confirmed under a voltage application as in Example 1.

EXAMPLE 4

On a display panel prepared in the same manner as in Example 1, a transparent epoxy resin, hardenable at the room temperature, was applied and a polyester film of a thickness of 50 μm was adhered as a surface protective layer. This display panel, in a continuous display inversion operation under the application of a signal of 1 Hz, showed a normal function even after 24 hours.

COMPARATIVE EXAMPLE 1

A display panel, prepared in the same manner as in Example 1 up to a stage shown in FIG. 6C but without the film formation, was subjected to a display operation in the same manner as in Example 1. The insulating liquid 3 evaporated gradually, and the black-and-white display operation became impossible within 20 minutes because of drying.

COMPARATIVE EXAMPLE 2

A display panel, prepared in the same manner as in Comparative Example 1 and capable of display operation, was covered with a polyester film of a thickness of 50 μm via a frame-shaped spacer of a thickness of 50 μm, and the periphery was sealed with an epoxy resin hardenable at the room temperature, thereby obtaining a display panel.

In such display panel, the liquid droplets of the display panel in contact with the polyester film moved along such film and could not maintain a state of independent liquid droplets, thereby resulting in a significant unevenness of the display.

What is claimed is:

1. An electrophoretic display device for executing a display by dispersing charged particles in a liquid and moving the charged particles under application of an electric field, the device comprising:
    a first substrate;
    a film mounted on the first substrate and forming a closed portion having a volume with a surface of the first substrate; and
    a liquid positioned in the closed portion, with charged particles being dispersed in the liquid,
    wherein the first substrate has a pair of electrodes formed by a planar electrode under the closed portion and an annular electrode surrounding the closed portion, and voltage is applied between the pair of electrodes to move the charged particles along a plane of the substrate to execute a display.

2. The device according to claim 1, wherein the closed portion constitutes a pixel.

3. The device according to claim 1, wherein a second substrate is positioned opposite to the first substrate, and a top portion of the film is in contact with the second substrate.

4. The device according to claim 1, wherein a second substrate having an electrode is positioned opposite to the first substrate, and a voltage is applied between the electrode of the first substrate and the electrode of the second substrate to move the charged particles between the first substrate and the second substrate and execute a display.

5. The device according to claim 1, wherein the film is covered with a protective layer.

6. The device according to claim 1, wherein the substrate has thereon a region of a higher affinity to the liquid and a region of a lower affinity, and the closed portion is positioned in the region of the higher affinity.

7. The device according to claim 6, wherein the region of the higher affinity is surrounded by the region of the lower affinity.

8. The device according to claim 6, wherein the region of the lower affinity is formed of a hydrophilic material.

9. The device according to claim 1, wherein the film is formed from a polymer material.

10. The device according to claim 9, wherein the polymer material is any one of polyamide resin, polyurethane resin, polyester resin, polyurea resin, polymelamine resin, epoxy resin and phenol resin or a mixture thereof.

11. A method of producing an electrophoretic display device for executing a display by dispersing charged particles in a liquid and moving the charged particles under application of an electric field, the method comprising:
    a step of forming, on a surface of a substrate, a region of a higher affinity to the liquid and a region of a lower affinity;
    a step of forming a droplet of the liquid, in which the charged particles are dispersed, in the region of the higher affinity; and a step of covering the surface of the liquid droplet not in contact with the substrate with a film.

12. The method according to claim 11, wherein the covering step includes contacting the liquid droplet with a liquid containing a monomer or a prepolymer forming a film-forming material to form a polymer on a surface of the liquid droplet.

13. The method according to claim 12, wherein the film-forming material contained in the liquid contacted with the liquid droplet in the film forming step is two or more selected from polyvalent amines, phenols, aldehydes, polyalcohols, polybasic acid halides, polyisocyanates and polyepoxides.

14. The method according to claim 11, wherein the step of forming a film on a surface of the liquid droplet not in contact with the substrate is a step of contacting the liquid droplet with a solution of a film-forming material dissolved in a solvent and removing the solvent.

15. The method according to claim 14, wherein the film forming material is polystyrene, acrylonitrile-styrene resin, polyvinyl formal, polyvinyl acetal, acrylic resin or polyvinyl acetate.

16. The method according to claim 11, wherein the liquid in which the charged particles are dispersed contains a first film-forming material, and the step of forming a film on a surface of the liquid droplet not in contact with the substrate is a step of contacting the liquid droplet with a liquid containing a second film-forming material and reacting the first film-forming material and the second film-forming material at a surface of the liquid droplet.

17. The method according to claim 16, wherein the first film-forming material is a substance having a plurality of positions capable of executing a condensation reaction with a compound having an active hydrogen, and the second film-forming material is a compound having a plurality of active hydrogens.

18. The method according to claim 17, wherein a film formed on the surface of the liquid droplet is composed of a polyurethane resin, a polyurea resin, a polyester resin or a polyamide resin.

19. The method according to claim 11, wherein the liquid droplet formed in the liquid droplet forming step has a contact angle of 10° or more to the surface of the first substrate.

20. The method according to claim 11, wherein the step of forming the region of the higher affinity and the region of the lower affinity includes a step of partially positioning a hydrophilic material on a hydrophobic material surface of the substrate.

21. The method according to claim 20, wherein the hydrophilic material is a hydrophilic resin.

22. The method according to claim 21, wherein the hydrophilic resin is a polyalcohol, a polyacrylamide, a polysaccharide, a polycarboxylic acid or a mixture thereof.

23. The method according to claim 20, wherein the hydrophobic material is a hydrophobic resin.

24. The method according to claim 23, wherein the hydrophobic resin is a polystyrene, a polyacryl ester, a polyalkene or a mixture thereof.

25. The method according to claim 11, wherein the step of forming the region of the higher affinity and the region of the lower affinity includes a step of modifying a hydrophobic surface of a substrate to a hydrophilic surface.

26. An electrophoretic display device comprising:
a substrate having a pair of electrodes;
a liquid droplet disposed in contact with the substrate;
charged particles dispersed in the liquid droplet; and
a film covering the surface of the liquid droplet to confine the liquid droplet in a closed portion,
wherein the electrodes are formed by a planar electrode under the closed portion and an electrode surrounding the closed portion in the same shape as the film, and voltage is applied between the electrodes to move the charged particles to the planar electrode or to the surrounding electrode in accordance with the polarity of the voltage thereby to execute a display.

27. The electrophoretic display device according to claim 26, wherein the shape of the electrode surrounding the closed portion is circular.

28. The electrophoretic display device according to claim 26, wherein the shape of the electrode surrounding the closed portion is polygonal.

* * * * *

UNITED STATES PATENT AND TRADEMARK OFFICE
CERTIFICATE OF CORRECTION

PATENT NO. : 6,906,851 B2  Page 1 of 1
DATED : June 14, 2005
INVENTOR(S) : Satoshi Yuasa It is certified that error appears in the above-identified patent and that said Letters Patent is hereby corrected as shown below:

Column 6,
Line 11, "strength" should read -- strength, --.

Column 8,
Line 48, "Charges" should read -- Charged --.

Column 9,
Line 6, "the color" should read -- the color --.
Line 59, "in an" should read -- in --.

Column 12,
Line 46, "coated" should be deleted.

Column 15,
Line 27, "parts by." should read -- parts by --.
Line 40, "Isoper H" should read -- Isopar H (Exxon) --.

Signed and Sealed this

Twenty-fifth Day of April, 2006

JON W. DUDAS
*Director of the United States Patent and Trademark Office*